Nov. 10, 1959    J. KOCEE    2,911,926
INCINERATING DEVICE AND METHOD
Filed Oct. 8, 1956    3 Sheets-Sheet 1

INVENTOR.
JIME KOCEE
BY
Mellin and Hanscom
ATTORNEYS

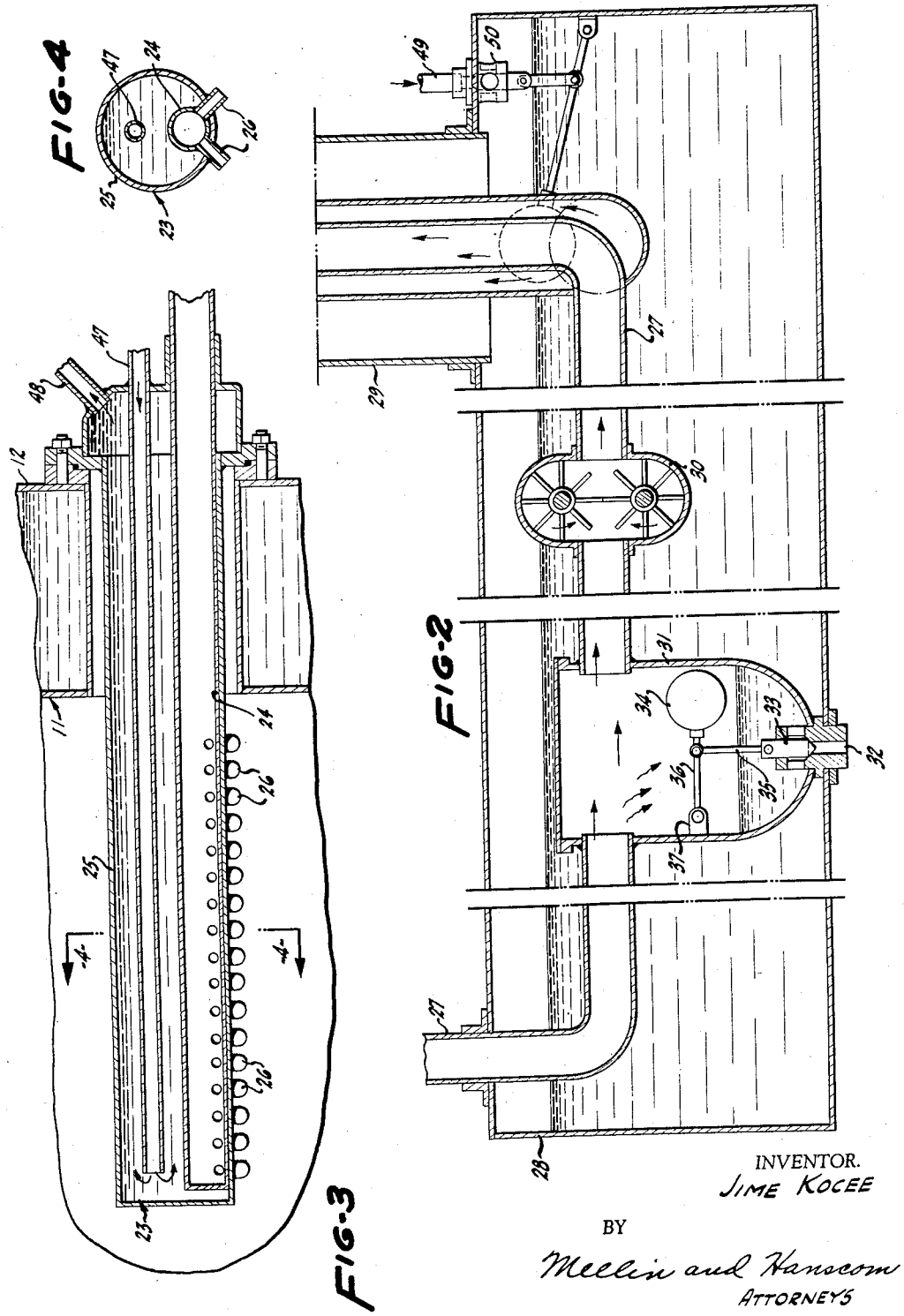

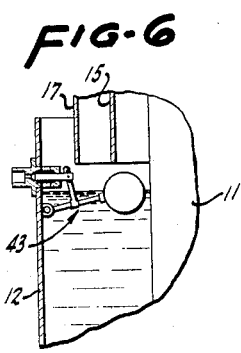
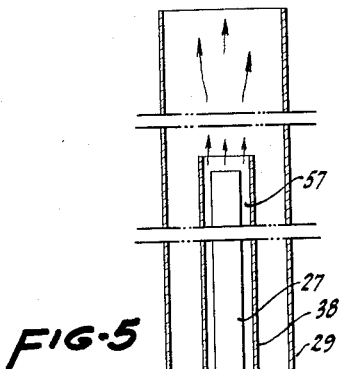
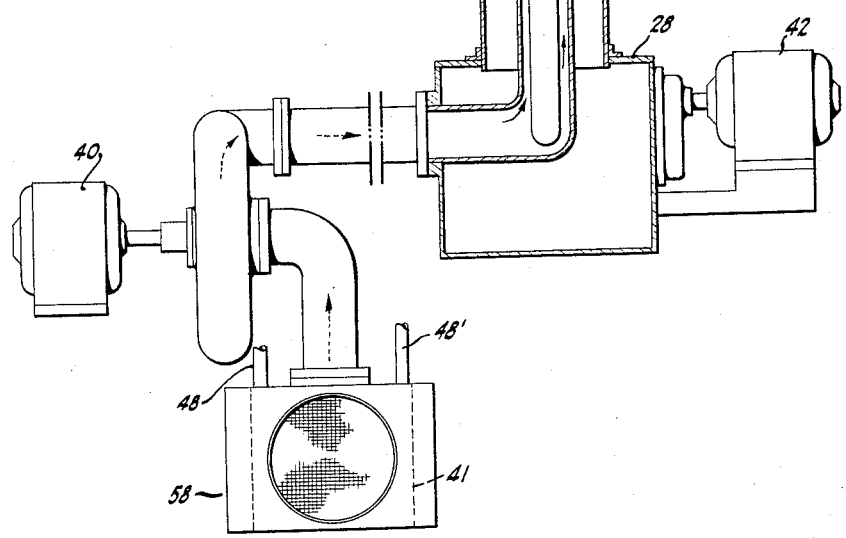
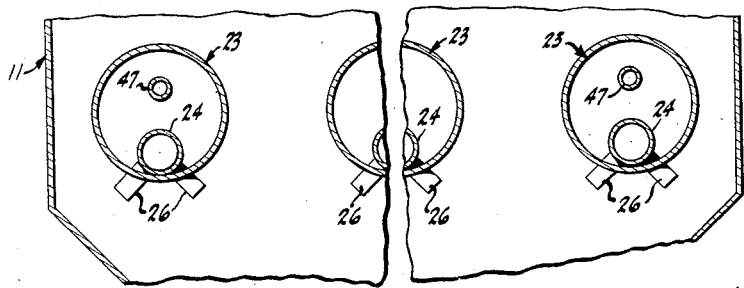

United States Patent Office 2,911,926
Patented Nov. 10, 1959

2,911,926

INCINERATING DEVICE AND METHOD

Jime Kocee, San Francisco, Calif., assignor of one-seventh to Louis Economou, one-seventh to Thanos Economou, one-seventh to Peter A. Castles, one-seventh to Louis P. Golfas, one-seventh to John M. Hontalas, San Francisco, Calif., and one-seventh to Anthony J. Mathews, San Bruno, Calif., jointly Application October 8, 1956, Serial No. 614,496

3 Claims. (Cl. 110—18)

This invention relates to incinerators, and particularly to a device for and method of incinerating products of the character of rice hulls.

It is among the primary objects of this invention to provide a new and improved apparatus for and method of incinerating rice hulls.

Another object of the invention is to provide a rice hull incinerating apparatus and method by which rice hulls may be disposed of in large volume, and by which the ash residue may be conditioned for commercial use.

A further object is to provide an incinerating apparatus in which combustion is maintained by a draft drawn downwardly through a combustion chamber to a stack laterally spaced therefrom, for preventing the scattering of partially burned hulls, and for utilizing the by-products of combustion.

A further object is to provide apparatus provided with cooling means for protecting the apparatus from damage due to heat in the course of the incinerating operation.

It is also an object of this invention to provide an apparatus and method by which the incineration of rice hulls may be controlled to obtain a commercially usable ash having controlled characteristics.

A still further object is to provide an incinerating apparatus and method for disposing of rice hulls whereby the production of objectionable smoke, and the distribution of ash residue into the air, may be effectually controlled and minimized.

The invention also has for an object the provision of an apparatus and method which may be economically built and operated, and in which the heat and residues produced by combustion may be utilized.

One form which the invention may assume is exemplified in the following description and illustrated by way of example in the accompanying drawings, in which:

Fig. 2 is a fragmental vertical longitudinal mid-sectional view of a portion of the apparatus shown in Fig. 1, the figure being drawn upon a somewhat larger scale.

Fig. 3 is a longitudinal mid-sectional detail view showing a draft manifold and cooling means therefor made in accordance with the present invention.

Fig. 4 is a transverse sectional view of the manifold, the plane of the section being indicated by the line 4—4 of Fig. 3.

Fig. 5 is a fragmental view, partially in vertical midsection, of a portion of the stack and associated mechanism.

Fig. 6 is a fragmental sectional detail view illustrating a means for maintaining the supply of cooling water at a predetermined level in the jacket enclosing the combustion chamber.

Fig. 7 is a fragmental transverse sectional view, partially diagrammatic, illustrating an apparatus embodying a plurality of draft manifolds.

Figure 1:
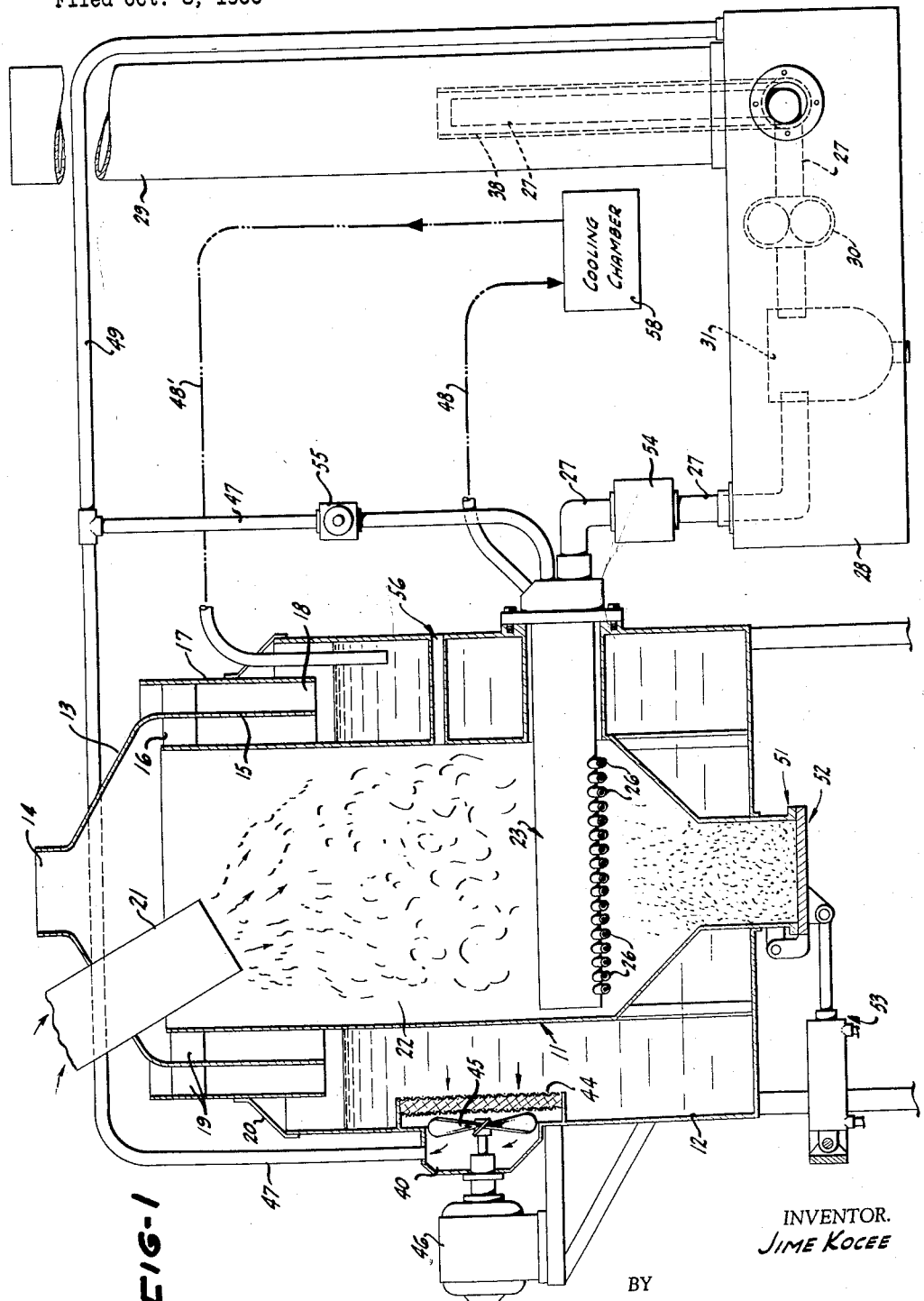
Fig. 1 is a side elevational view, partly in vertical longitudinal mid-section, illustrating an apparatus embodying the invention.

In terms of broad inclusion, the device of the present invention comprises a combustion chamber into which rice hulls and the like may be introduced from the top, and in which a draft manifold is mounted in the lower portion of the chamber for drawing air and combustion gases downwardly through the burning hulls and delivering the combustion products to a stack laterally spaced from the combustion chamber. The draft manifold which, if desired, may comprise a plurality of ducts, provides support for a mass of hulls within the chamber. Water jackets substantially enclose the combustion chamber and the manifold and also the conduit connecting the manifold to the stack. The invention also contemplates the provision of means for collecting entrained and/or condensed liquid from the combustion gases and the introduction of a supplemental air supply to mingle with the combustion gases in the stack. Hulls are introduced into the top of the combustion chamber and the ash residue is removed from the bottom, provision being made for regulating the supply of hulls, the air draft, the supply of cooling water, and other factors to obtain an ash residue possessing desired characteristics for commercial use in various ways.

In terms of greater detail, the device of the present invention comprises a combustion chamber designated in general by the numeral 11. The combustion chamber is surrounded by a housing 12, arranged to hold a relatively large volume of water for cooling the apparatus, as hereinafter more fully explained. The top of the combustion chamber is covered by a hood 13, having an opening 14 over the chamber 11, and having a cowl portion 15 extending downwardly over the top of the chamber in spaced relation thereto to form an air passage 16 around the top of the chamber. A baffle plate 17 extends around the cowl 15 in spaced relation thereto to provide an air passage 18 opening into the housing 12. The cowl 15 and the baffle plate 17 are supported in spaced relation to the chamber 11, and to each other, by strays 19 and bracing means 20 secured to the top of the housing 12 and to the baffle 17, as best shown in Fig. 1. The cowl 15 and baffle 17 extend into the top of the housing to a point above the normal water level maintained in the housing, so that air may be drawn into the top of the chamber 11 through the passages 16 and 18.

Opening into the top of the combustion chamber 11 through the hood 13 is a chute 21, through which a mass of rice hulls 22 may be introduced into the chamber. The rice hulls may of course be delivered to the chute 21 by a conveyor or other delivery means, not shown.

A draft manifold 23, which may be one or a plurality of units, is mounted within the lower portion of the combustion chamber. Where a plurality of units is provided, as indicated in Fig. 7 of the drawings, the units may function as a grate to support the hulls for combustion thereabove. As illustrated, each manifold unit, designated in general by the numeral 23, comprises a tubular member 24, substantially enclosed within a jacket 25. Nipples 26, arranged in downwardly diverging rows along the under side of the manifold unit, open from the chamber 11 into the tubular member 24 through the jacket 25. The nipples are welded or otherwise secured in sealed connection with the jacket 25 and the member 24, and the angularly disposed and downwardly pointed arrangement of the nipples prevents clogging by the hulls or the residue therefrom.

The tubular manifold member 24 extends laterally outwardly through the housing 12 and into a conduit 27 forming an extension thereof. The conduit 27 is extended through a housing 28 arranged to contain a supply of water. From the housing 28, the conduit 27 is extended upwardly into the bottom of a stack 29 laterally spaced from the combustion chamber 11. The bottom of the stack 29 seats upon the housing 28, and preferably opens therein, as best shown in Fig. 2.

Mounted in connection with the conduit 27 is a suction pump 30, driven by a motor 42, to draw air through the draft manifold and deliver it into the bottom of the stack. The pump is preferably mounted within the housing 28, and is normally substantially covered by water contained therein, whereby it is cooled to prevent damage thereto by the hot combustion gases pumped thereby from the combustion chamber to the stack. The pump may be of any desired type, mounted and operated in conventional manner.

Within the housing 28, preferably between the pump 30 and the combustion chamber, is a trap 31 arranged to catch liquids entrained by the combustion gases, or condensed therefrom. The trap is substantially covered by the water contained in the housing 28. An outlet 32 in the bottom of the trap 31 is normally closed by a valve member 33, which is actutaed by a float 34. The valve member 33 is connected to a rod 35 pivoted to a float arm 36 which, in turn, is pivoted to a lug 37 within the trap. The float is arranged to lift the valve member 33 when liquid collected in the trap reaches a predetermined level, as best indicated in Fig. 2.

The portion of the conduit 27 which extends upwardly into the bottom of the stack 29 is surrounded by a tube 38 spaced from the conduit to provide an air passage 57 surrounding the conduit. A secondary air pump 39 is connected to the tube 38, said pump 39 being actuated by a motor 40 to draw air through a filter 41 and direct it as a jet issuing adjacent the inner end of the conduit 27. The jet aids in drawing combustion gases into the stack and supplies added oxygen to support combustion of any combustible gases which may be delivered into the stack and with which the secondary air supply is commingled as the air and gases issue through the conduit 27 and tube 38. The stack serves as a chamber for burning uncombusted gases drawn from the chamber 11 and is of a height sufficient to produce an updraft for discharging the gases.

Water is delivered into the housing 12, which serves as a water jacket surrounding the combustion chamber 11, through a float valve 43 operable to maintain the water level at a desired height within the housing, as indicated in Fig. 6. Water from the housing is pumped through a filter 44 by a pump 45 driven by a motor 46. The pump 45 operates to circulate water from the supply maintained in the housing 12 through a pipe 47 to the jacket 25. A pipe 48 connected to the jacket 25 delivers water from the jacket to a cooling chamber 58 surrounding the secondary air intake through filter 41. A pipe 48' conducts the water, cooled by the air intake, back into the housing, so as to maintain a continuous circulation of water through the jacket 25. The cooling that occurs as the water passes through the chamber 58 prevents overheating of the water and improves its cooling action throughout the system.

A pipe 49 connects the pipe 47 to the housing 28 through a float valve 50. When the water level within the housing reaches a predetermined level, the float valve 50 closes off the supply of water through the pipe 49, which operates as a by-pass from the pipe 47 to maintain the water supply in the housing 28.

The bottom of the combustion chamber 11 is shaped to form a hopper 51 normally closed by a gate 52 pivoted to its lower end, as shown in Fig. 1 of the drawings. The gate is arranged to be actuated between open and closed positions by a hydraulic or pneumatic cylinder 53 of ordinary construction mounted and operating in conventional manner. The gate 52 is of sufficient size to admit a bar or other tool for loosening the ash residue if it cakes within the bottom of the combustion chamber.

The character of the ash residue varies with conditions of heat and oxidation maintained within the combustion chamber. By appropriate regulation of the supply of hulls and air and the circulation of cooling water, residue suitable for commercial use in different ways may be produced. For that purpose, a draft control damper 54 is mounted in the conduit between the draft manifold 23 and the housing 28. Also, a regulating valve 55 is provided in the pipe 47 for regulating the rate of circulation of water through the draft manifold.

The ash residue varies in texture and appearance. A white, finely divided product, useful as an abrasive in toothpastes, soaps, and fine polishing compounds, results from an operation regulated to obtain normal temperature for a long period. When the process is speeded to shorten the period, and/or increase the temperature within the combustion chamber, a pinkish residue is produced which has been found to be commercially valuable as an absorbent, especially useful for absorbing oil from garage floors.

In operation, the combustion chamber 11 is initially filled to about one-half its capacity and combustion is initiated by introducing enough inflammable fuel to penetrate the mass of hulls. The fuel is ignited through an ignition tube 56 opening into the combustion chamber through the surrounding jacket. At the same time, the main suction pump 30 is set into motion to draw air through the hulls for maintaining combustion by the aid of a draft drawn downwardly through the hulls to the draft manifold. After the combustion has progressed for a considerable period, the center portion of the mass of hulls attains a very high temperature, sufficient to cause relatively rapid combustion of hulls thereafter delivered into the chamber. The outer portion of the mass is less rapidly burned, and serves as an insulating body between the intense heat at the center and the chamber wall.

At the same time, the supply of water maintained in the housing 12 serves to cool the chamber walls and prevent damage thereto by the intense heat at the center of the chamber. Also, the circulation of water from the housing 12 through the jacket 25 cools the draft manifold and prevents damage thereto by the heat of the burning hulls.

After combustion has been initiated and has progressed to a self-sustaining condition, additional rice hulls are introduced through the chute 21 at intervals or continuously at a rate approximating the rate at which the hulls are consumed. Incompletely combusted gases drawn into the stack are mixed with air introduced through the passage 57 surrounding the conduit 27, thereby insuring complete combustion of the gases and permitting a substantially smoke-free delivery of fully combusted gases from the stack.

The ash residue is removed periodically from the bottom of the combustion chamber through the gate 52. By appropriate regulation of the supply of hulls, the draft, and the water circulation, the quality of the residue may be regulated to satisfy different commercial requirements. Combustion is self-sustaining after it is first initiated, and the incineration of rice hulls may be maintained as a continuous operation with a minimum of attention and cost. The reclaiming of a commercially salable residue yields a substantial return, whereas ordinary methods of hull disposal have heretofore involved a burdensome expense.

While I have shown the preferred form of my invention, it is to be understood that various changes may be made therein without departing from the spirit of the invention as defined in the appended claims.

Having thus described my invention, what I claim and desire to secure by Letters Patent is:

1. An incinerator for the combustion of waste material comprising an open topped combustion chamber, a hood mounted over the top of the chamber and having a cowl portion surrounding the top of the chamber in spaced relation thereto, said hood having an opening above the chamber, a draft manifold extending across the lower portion of said chamber, a plurality of downwardly projecting nipples connected to said manifold to convey combustion gases from the combustion chamber into the manifold, means for introducing waste material into said chamber above said manifold, a stack spaced from said chamber, conduit means for conveying products of combustion from said draft manifold to said stack, blower means disposed in said conduit for drawing air downwardly through said chamber and for drawing combustion products from said chamber through said manifold and directing them to said stack, first water jacket means surrounding said combustion chamber, second water jacket means within said chamber surrounding said manifold, and means for circulating cooling water through said first and second water jacket means.

2. An incinerator for the combustion of waste material comprising an open topped combustion chamber, a draft manifold extending across the lower portion of said chamber, a plurality of downwardly projecting nipples connected to said manifold to convey combustion gases from the combustion chamber into the manifold, means for introducing waste material into said chamber above said manifold, means closing the bottom of said chamber and openable for removing ash residue, a stack spaced from said chamber, conduit means for conveying products of combustion from said draft manifold to said stack, blower means disposed in said conduit for drawing air downwardly through said chamber and for drawing combustion products from said chamber through said manifold and directing them to said stack, trap means in said conduit between said manifold and said blower for entrapping entrained and condensed liquids carried by said combustion products, first water jacket means surrounding said combustion chamber, second water jacket means within said chamber and surrounding said manifold, third water jacket means surrounding said trap means and said blower, and means for circulating cooling water through said first, second and third water jacket means.

3. An incinerator for the combustion of waste material comprising an open topped combustion chamber, a hood mounted over the top of the chamber and having a cowl portion surrounding the top of the chamber in spaced relation thereto, said hood having an opening above the chamber, a baffle surrounding the cowl portion in spaced relation thereto for supplementing the air entering said chamber through the hood opening, a draft manifold extending across the lower portion of said chamber, a plurality of downwardly projecting nipples connected to said manifold to convey combustion gases from the combustion chamber into the manifold, means for introducing waste material into said chamber above said manifold, means closing the bottom of said chamber and openable for removing ash residue, a stack spaced from said chamber, conduit means for conveying products of combustion from said draft manifold to said stack, blower means disposed in said conduit for drawing air downwardly through said chamber and for drawing combustion products from said chamber through said manifold and directing them to said stack, means for delivering air into said stack coincidentally with the delivery of said combustion products thereto, trap means in said conduit between said manifold and said blower for entrapping entrained and condensed liquids carried by said combustion products, first water jacket means surrounding said combustion chamber and extending upwardly to said baffle, second water jacket means within said chamber and surrounding said manifold, third water jacket means surrounding said trap means and said blower, and means for circulating cooling water through said first, second and third water jacket means.

References Cited in the file of this patent

UNITED STATES PATENTS

| | | |
|---|---|---|
| 1,125,976 | DeCarie et al. | June 26, 1915 |
| 1,226,868 | Dodd | May 22, 1917 |
| 1,877,214 | Woodman | Sept. 13, 1932 |
| 2,092,680 | Pudney | Sept. 7, 1937 |
| 2,244,024 | Schadek | June 3, 1941 |
| 2,732,837 | Porwancher et al. | June 31, 1956 |
| 2,847,951 | Triggs | Aug. 19, 1958 |

FOREIGN PATENTS

| | | |
|---|---|---|
| 534,788 | France | Jan. 13, 1922 |
| 891,183 | France | Nov. 29, 1943 |